United States Patent
Randall

(10) Patent No.: US 6,744,592 B2
(45) Date of Patent: *Jun. 1, 2004

(54) CLEANER STRIP FOR ROLLERS OF CARTRIDGE LOADER

(75) Inventor: Lee Curtis Randall, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/454,249

(22) Filed: Jun. 3, 2003

(65) Prior Publication Data

US 2003/0205244 A1 Nov. 6, 2003

Related U.S. Application Data

(62) Division of application No. 09/960,437, filed on Sep. 21, 2001, now Pat. No. 6,615,435.

(51) Int. Cl.⁷ .............................................. G11B 15/68
(52) U.S. Cl. ........................................ 360/92; 360/132
(58) Field of Search ............................... 360/92, 132

(56) References Cited

U.S. PATENT DOCUMENTS

| 2,394,855 | A | 2/1946 | Gould ........................ 197/184 |
| 4,811,444 | A | 3/1989 | Hamblin ................. 15/104.002 |
| 4,843,436 | A | 6/1989 | Evangelista et al. ......... 355/133 |
| 5,460,476 | A | 10/1995 | Gazza ........................ 414/786 |
| 5,519,910 | A | 5/1996 | Messina ................. 15/104.002 |
| 5,536,328 | A | 7/1996 | Morgavi ................ 15/104.002 |
| 5,601,391 | A | 2/1997 | Gazza ........................ 414/280 |
| 5,896,157 | A | 4/1999 | Fisher, Sr. .................. 347/171 |
| 5,953,301 | A | 9/1999 | Shimo et al. ................. 369/71 |
| 6,030,674 | A | 2/2000 | Onishi et al. .............. 428/40.1 |
| 6,414,816 | B2 * | 7/2002 | Hikita .......................... 360/92 |
| 6,615,435 | B2 * | 9/2003 | Randall ................. 15/104.002 |

FOREIGN PATENT DOCUMENTS

JP 404028053 A * 1/1992

* cited by examiner

Primary Examiner—A. J. Heinz
(74) Attorney, Agent, or Firm—Antonio R. Durando; Quarles & Brady Streich Lang LLP

(57) ABSTRACT

A strip with an exterior sticky surface is judiciously selected for its ability to entrap dust and other loose debris without interfering with the operation of moving parts contacted thereby. The strip is attached to the sides of a magnetic tape cartridge, with the sticky surface facing outward, in places contacted by rollers and/or belts during the process of handling the cartridge in an automated system. Thus, any loose debris in the rollers or belts is retained by the tacky surface of the strip as the cartridge passes through the rollers and belts of the robotic system. The strips of the invention may be removably adhered to the data cartridge, or may be permanently attached. In a particular embodiment of the invention, the strips may be incorporated into a cleaner cartridge for the periodic maintenance of loading equipment.

20 Claims, 4 Drawing Sheets

CLEANER STRIP FOR ROLLERS OF CARTRIDGE LOADER

RELATED APPLICATIONS

This application is a divisional application of U.S. Ser. No. 09/960,437, filed Sep. 21, 2001 and now U.S. Pat. No. 6,615,435.

BACKGROUND OF THE INVENTION

1. Field of the Invention

This invention relates generally to robotic systems for handling magnetic cartridges and other data-storage devices. In particular, the invention relates to an adhesive strip for cleaning the rollers of cartridge loaders and similar handling apparatus.

2. Description of the Related Art

Electronic data-storage equipment often involves removable media that may take the form of a magnetic tape cartridge, an optical disk cartridge, a floppy disk, an optical cartridge, a magneto-optical disk cartridge, or other type of storage unit. The portability of these removable-media units makes it possible to store large amounts of data in many storage units which can then be stored in readily accessible libraries or archived for future use. When a particular removable-media unit is needed for use in a computer, for example, the unit is retrieved and loaded for processing, either manually or automatically.

Automatic retrieval is done either in libraries or automatic cartridge loaders (ACLs). Libraries use one or more movable robotic pickers to retrieve cartridges from storage cells and load them into one or more I/O drives or devices. ACLs use a movable magazine of cartridges and stationary robotics to move cartridges to one drive. The cartridges are of two types, data and cleaner, and have the same general geometry, so that the robotic picker and the ACL need not be designed to handle two distinct cartridge designs. Conventional cleaner cartridges have internal mechanisms for cleaning the read/write head of the device performing I/O. For example, tape cleaner cartridges may have a woven fabric that runs over the magnetic head to clean it. Similarly, optical cleaner cartridges may have a brush which is stroked over the focus lens of the device to clean it.

The mechanism through which a removable-media unit is transferred and/or loaded into a computer peripheral or device includes rollers and belts that guide and drive the unit in and out of the machine. An example of a mechanism the includes such loader rollers and belts is the pass-through picker assembly for magnetic tape cartridges used in the IBM® 3575 Magstarg® MP tape library described in U.S. Pat. No. 5,601,391 (Gazza). As illustrated in FIG. 1, the picker assembly 10 is interposed between a storage device 12, such as a magnetic tape drive, and a plurality of storage cells 14 in a magazine 16 containing data cartridges 18 available for selection and loading into the device 12. Upon being positioned in line with a selected data cartridge, the picker assembly automatically retrieves it from the magazine and retains it while the assembly 10 is translated for alignment with the storage device 12. The cartridge is then passed through the picker assembly 10 and loaded into the device 12. After processing, the data cartridge 18 is similarly removed from the storage device 10 and translated back in alignment with a preselected empty cell where, following a reverse pass-through operation, it is again stored in the magazine 16.

As shown in FIG. 2, the picker assembly 10 incorporates independently operating, hinged, front and rear gripper arms 20,22 and 24,26 aligned with the magazine 16 and the storage device 12, respectively. Each set of gripper arms is operable between an open position, such as necessary to receive a data cartridge, and a closed position, wherein the arms grip the cartridge and automatically pass it through the picker assembly. FIG. 3 illustrates the front gripper arms 20,22 in closed position over a data cartridge 18, showing the top and bottom sides of the cartridge in contact with a drive belt 28 and a pinch or feed roller 30 that cooperate to grab and move the cartridge through the gripper assembly. The rear gripper arms 24,26 are shown idle, in an open position, with a corresponding driver belt 32 and a feed roller 34 adapted to receive the cartridge and complete the pass-through operation.

As apparent from the drawings, the belts 28,32 and rollers 30,34 are necessarily exposed to the environmental conditions of the automated storage system. Therefore, with use these belts and rollers accumulate dust and other debris that effect their performance and require periodic cleaning. Typically, this kind of maintenance may be neglected or performed manually by a service person, which is expensive and time consuming. Accordingly, it would be very desirable to be able to clean loader rollers and belts automatically. This invention provides a simple solution toward that end.

BRIEF SUMMARY OF THE INVENTION

The primary objective of this invention is a device for automatically cleaning loader rollers and belts in removable storage-media equipment.

Another objective of the invention is a method and apparatus that can be used in equivalent fashion with all types of data-storage devices and loading mechanisms.

Another goal is an invention that is suitable for relatively simple incorporation within existing robotic equipment.

Still another goal is a method and apparatus that can be carried out advantageously without modification to existing loading equipment.

A final objective is an approach that can be implemented easily and economically according to the above stated criteria.

Therefore, according to these and other objectives, the invention consists of a strip with an exterior sticky surface judiciously selected for its ability to entrap dust and other loose debris without interfering with the operation of moving parts contacted thereby. The strip is attached to the sides of a magnetic tape cartridge, with the sticky surface facing outward, in places contacted by rollers and/or belts during the process of handling the cartridge in an automated system. Thus, any loose debris in the rollers or belts is retained by the tacky surface of the strip as the cartridge passes through the rollers and belts of the robotic system. The strips of the invention may be removably adhered to the data cartridge, or may be permanently attached. In a particular embodiment of the invention, the strips may be incorporated into a cleaner cartridge for the periodic maintenance of loading equipment.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

DESCRIPTION OF THE PREFERRED EMBODIMENTS OF THE INVENTION

This invention lies in the idea of providing a sticky surface on a data cartridge for retaining dust and other loose debris contacted by the cartridge while it is being handled by a robotic system, thereby advantageously removing the dust from the system. In particular, the invention is directed at removing particles residing on loader rollers and belts. Therefore, such sticky surface is provided in the form of a strip placed along those portions of the cartridge contacted by rollers and belts with the tacky side of the strip facing outwardly.

For purposes of illustration, the invention is described with reference to an automated magnetic tape storage system for use in a data processing environment, as described above. As one skilled in the art would readily recognize, though, the invention is not intended to be limited to magnetic tape cartridges or to data storage systems, but it could apply in equivalent fashion to any data storage unit contacted by rollers and/or belts in a robotic handling system. Moreover, the invention is described in terms of feed rollers and drive belts, but it is understood that the inventive concept applies in equivalent fashion to either, hereinafter referred to as feeders. Therefore, any reference to feeders in the description and claims is intended to apply to rollers, belts and other contact driving means.

Figure 1:
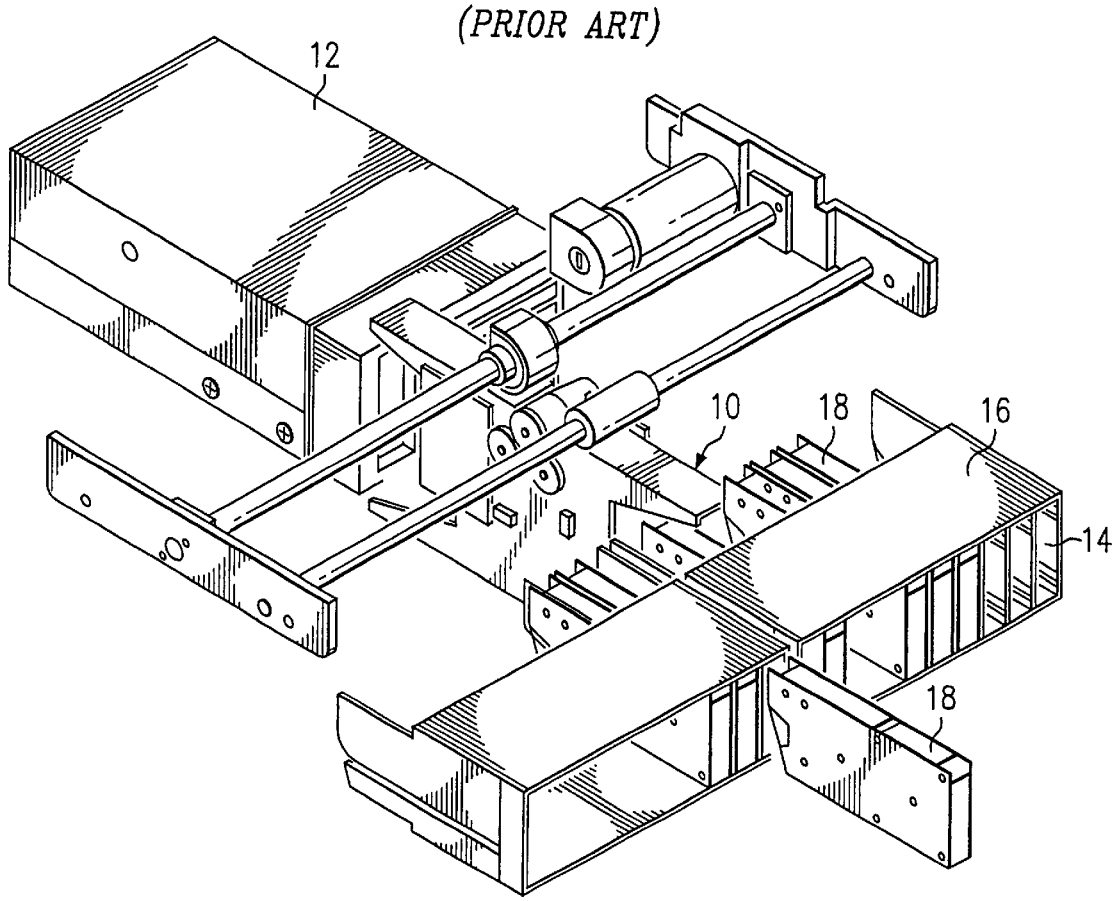
FIG. 1 is a perspective view of a conventional dual-gripper picker assembly in an automated storage system for data cartridges.
Figure 2:
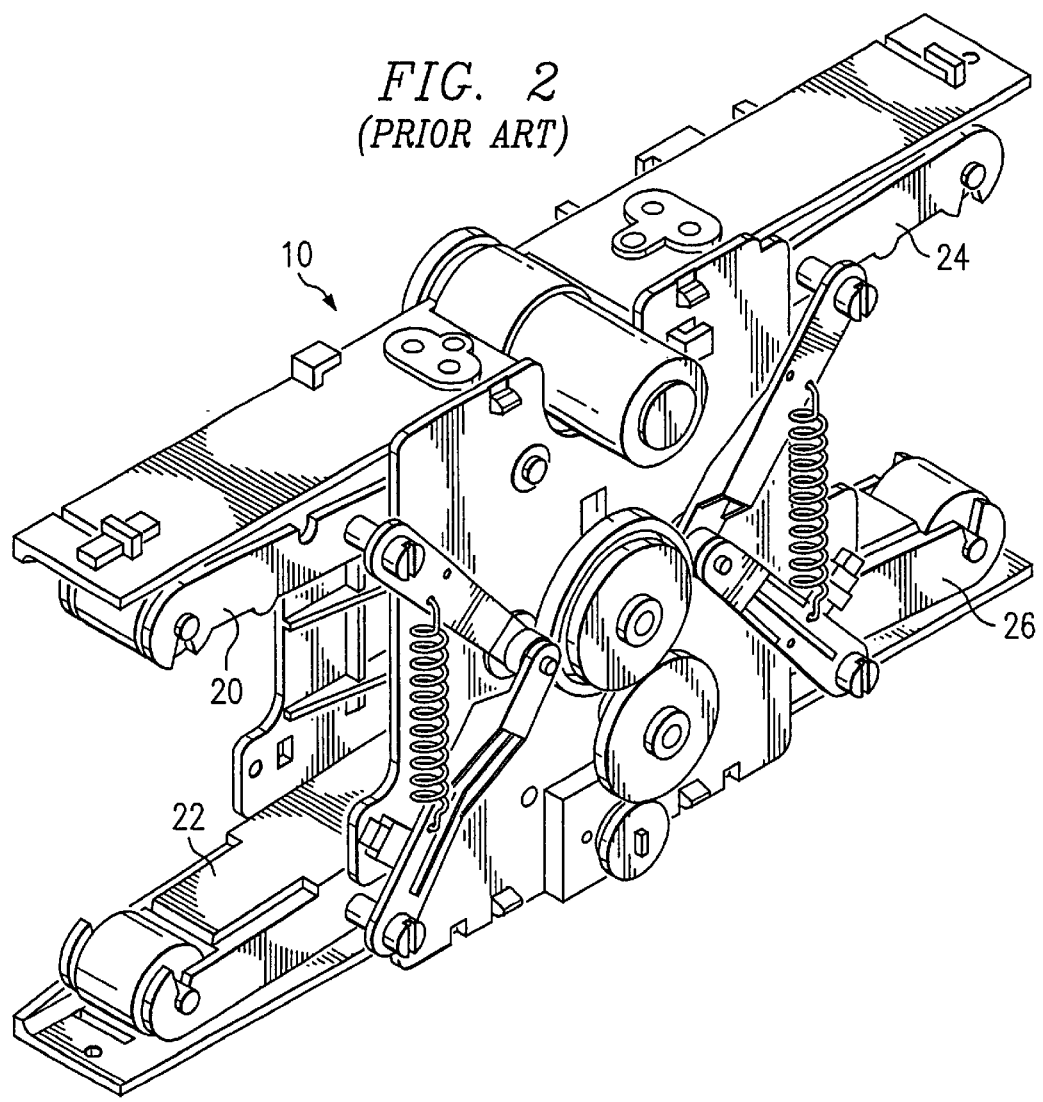
FIG. 2 is a perspective view of the picker assembly of FIG. 1 seen from the right side in that figure.
Figure 3:
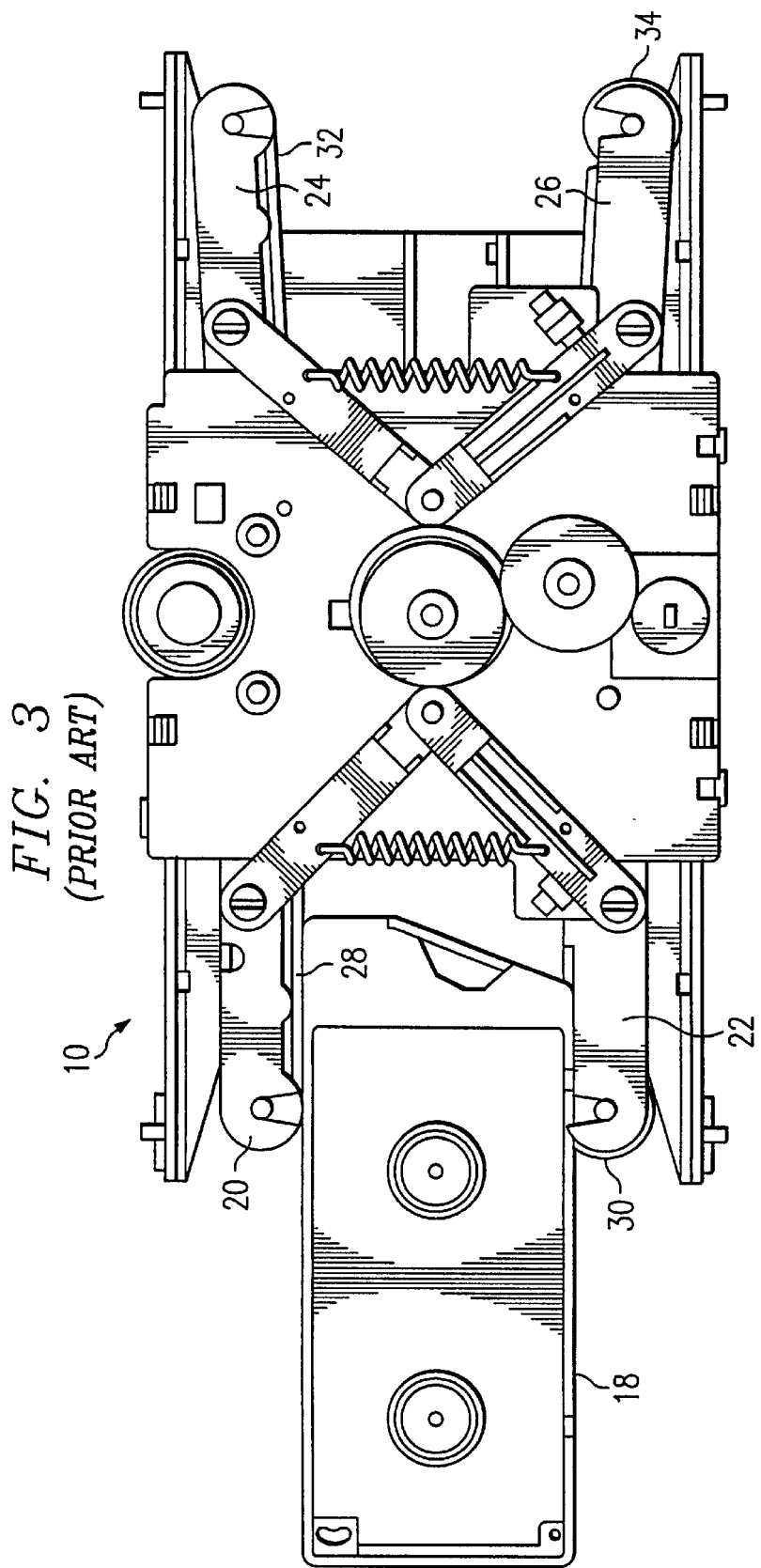
FIG. 3 is an elevational view of the picker of FIG. 2 showing a data cartridge held between the roller and belt in the front gripper arms of the unit.
Figure 4:
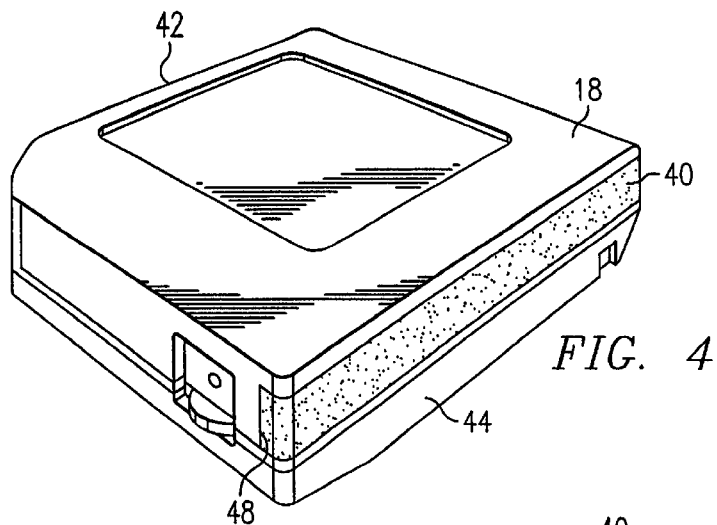
FIG. 4 is a perspective view of a tape cartridge with a cleaner strip attached to its sides according to one embodiment of the invention.

Referring to the drawings, wherein like parts are designated throughout with like numerals and symbols, FIG. 4 illustrates a strip 40 attached to a conventional cartridge 18 according to the invention. The cartridge 18 could be a magnetic-tape or a cleaner cartridge, both being equivalently suitable to practice the invention. The strip 40 is firmly adhered to the top and bottom sides 42,44 of the cartridge case, where the belt 28 and roller 30 contact the cartridge in the process of loading it in and unloading it from a storage device. The interior side of the strip 40 may be permanently attached to the cartridge 18, or it may be removably adhered using conventional contact adhesives such as used in stamps, product labels and price stickers. The exterior side of the strip 40 includes a dry film 46 of sticky material adapted to trap loose particles that contact the strip, so that they are removed from the surrounding environment. It is clear that the adhesive properties of the film 46 need to be sufficiently strong to retain debris particles but not so strong as to bind the rollers and belts that come into contact with the strip of the invention. The idea is for the strip 40 to remove from the rollers and belts particles that tend to decrease friction with the cartridge and reduce the efficiency of their operation. Thus, the cleaner strip of the invention is intended to function in a manner similar to fly paper for debris already present on the rollers and belts. In order to improve the adhesion of the strip 40 to the tape cartridge 10 and ensure that it is not stripped by loader rollers and belts during use, the cleaner strip may also be wrapped around the corners of the tape cartridge, as illustrated by the additional strip segment 48 in FIG. 4.

Figure 5:
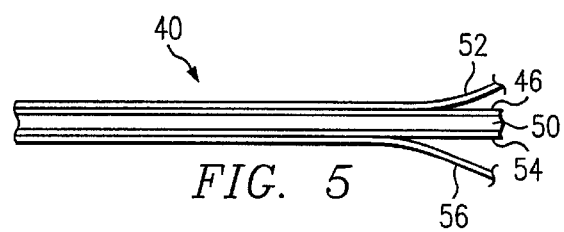
FIG. 5 is a side view of a segment of sticky strip showing its various layers according to another embodiment of the invention.

Thus, as illustrated schematically in the side elevational view of FIG. 5, one embodiment of the cleaner strip 40 may comprise an exterior film 46 of a first, moderately adhesive substance deposited over a substrate layer 50. A removable top cover 52 is preferably provided to protect the adhesive layer 46 prior to use. A stronger or equally strong adhesive layer 54, which may or may not be intended to allow removal of the strip 40 after installation on a cartridge, is deposited on the opposite side of the substrate 50 for firmly attaching the cleaner strip to the surface of a data cartridge. Finally, a removable bottom cover 56 is also preferably provided to protect the adhesive layer 54 prior to use.

For best performance, the outer layer 46 should have an adhesive strength in the 3.5–7.0 lbf/inch (60–120 Newtons/100 mm) according to ASTM D3330. The inner layer 54 should have an adhesive strength in the 7.0–15.0 lbf/inch (120–260 Newtons/100 mm) range according to ASTM D3330. Double-sided adhesive tapes sold by the 3M Company of St. Paul, Minn., as VHB Series 9460, 9469, and 9473 are suitable to practice the invention. Outer layers 52 and 56 may consist of any backing paper currently available for similar applications.

Figure 6:
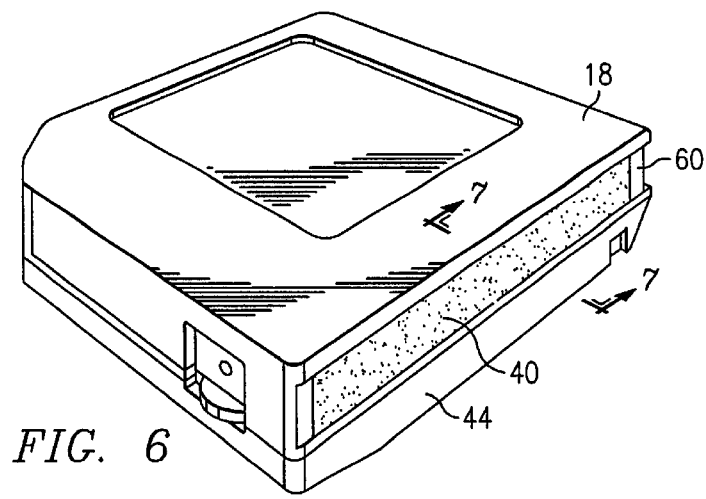
FIG. 6 is a perspective view of a tape cartridge with a cleaner strip attached to a recessed channel on the side thereof according to another embodiment of the invention.
Figure 7:
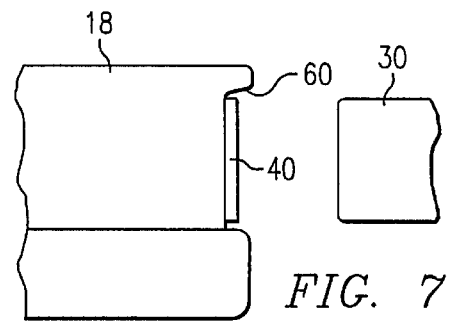
FIG. 7 is a partial cross-sectional view of the tape cartridge with a cleaner strip of FIG. 6 as seen from line 7—7 in that figure.

In another, preferred, embodiment of the invention illustrated in FIGS. 6 and 7, a recessed channel 60 is provided on the side of the cartridge 18 for receiving and housing the sticky strip 40 of the invention in a slightly inset position. The depth of the channel is preferably only slightly greater than the thickness of the strip as applied to the cartridge. This is done to avoid contact between the strip and any rigid structure that the sides 42,44 of the cartridge may butt against during normal use, thereby preventing binding of the cartridge within the robotic system. A recess depth of 1.5 to 3 times the thickness of the sticky strip 40 has been found to be suitable for the invention. At the same time, the recessed channel 60 and the sticky strip 40 are preferably wider than the feeder, so that rollers and belts can contact the strip and perform their normal driving function without interference with mechanical parts even with normal manufacturing, assembly, and interchange tolerances.

As mentioned, it is apparent that the idea of the invention is applicable to any removable data storage unit having a surface contacted by a pinch roller or drive belt in a robotic handling mechanism. Thus, the cleaner strip of the invention could be advantageously applied to IBM® 3480, 3490, 3590, 3570, and LTO (linear tape open) tape cartridges, as well as to high-density floppy disk cartridges, hard-disk-drive cartridges, optical cartridges such as DVD, and magneto-optical disk cartridges.

Inasmuch as the cleaner strips of the invention necessarily will tend to become saturated with debris, their effectiveness has a finite life. Accordingly, they may be used in conjunction with a conventional, disposable cleaner cartridge, to be recycled or thrown away when the cartridge is no longer usable. Such a cleaner cartridge could be used at predetermined times for scheduled maintenance; or, automatically, whenever a load failure is detected by the robotic system. Alternatively, the cleaner strips may be provided in removable form for data as well as cleaner cartridges, so that fresh strips may be applied to the cartridges periodically as old ones wear out.

Thus, a method and a device are provided for cleaning feed rollers and drive belts of tape-cartridge loaders. The invention may be implemented in the form of a cleaner strip adapted for attachment to a data-storage or a cleaner cartridge, a data-storage unit or a cleaner unit incorporating the cleaner strip, or a robotic handling system incorporating the cleaner strip in its data-storage units or in a cleaner unit.

Various changes in the details, steps and components that have been described may be made by those skilled in the art within the principles and scope of the invention herein illustrated and defined in the appended claims. For example, the substrate layer 50 may be eliminated from the strip 40 if one of the adhesive layers is sufficiently strong to provide structural support for the strip. Therefore, while the invention has been shown and described in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. An automated handling system for removable units, comprising:
    a plurality of removable units selectively transportable between alternative locations within the system;
    a loader mechanism for handling said removable units while transporting the units within the system, said loader mechanism including a feeder which engages opposed side edges of said units; and
    a cleaner strip attached to a surface of at least one side edge of at least one of said units to be contacted by said feeder;
    wherein the strip includes an outer adhesive layer adapted for trapping debris contacted thereby.

2. The system of claim 1, further comprising a protective layer removably attached to said adhesive layer.

3. The system of claim 1, wherein the strip further includes an intermediate substrate layer adhered to said surface of the unit to be contacted by said feeder.

4. The system of claim 3, wherein the strip further includes an inner adhesive layer between the intermediate substrate layer and the surface of the unit to be contacted by said feeder.

5. The system of claim 4, wherein said inner adhesive layer has an adhesive strength in the 120–260 Newtons/100 mm range according to ASTM D3330.

6. The system of claim 1, wherein said outer adhesive layer has an adhesive strength in the 120–260 Newtons/100 mm range according to ASTM D3330.

7. The system of claim 1, wherein said units include a data-storage cartridge.

8. The system of claim 7, wherein said data-storage cartridge is a magnetic-disk cartridge.

9. The system of claim 1, wherein said units include a cleaner cartridge.

10. The system of claim 1, wherein said feeder includes a roller.

11. The system of claim 1, wherein said feeder includes a belt.

12. A method of cleaning a feeder in a loader mechanism of an automated handling system for removable units, comprising the following steps:
    providing a cleaner strip attached to a surface of at least one side edge of a removable unit to be contacted by said feeder, wherein the strip includes an outer adhesive layer adapted for trapping debris contacted thereby; and
    operating the loader mechanism so as to cause the cleaner strip to contact the feeder.

13. The method of claim 12, wherein said cleaner strip comprises an outer adhesive layer with an adhesive strength in the 120–260 Newtons/100 mm range according to ASTM D3330.

14. The method of claim 12, wherein said cleaner strip comprises an inner adhesive layer attached to said surface of the removable unit with an adhesive strength in the 120–260 Newtons/100 mm range according to ASTM D3330.

15. The method of claim 12, wherein said removable unit is a magnetic-disk cartridge.

16. The method of claim 15, wherein said cleaner strip is wrapped around a corner of said magnetic-disk cartridge.

17. The method of claim 15, wherein said magnetic-disk cartridge includes a recessed channel and the cleaner strip is housed in said channel.

18. The method of claim 12, wherein said removable unit is a cleaner cartridge.

19. The method of claim 12, wherein said feeder includes a roller.

20. The method of claim 12, wherein said feeder includes a belt.

* * * * *